United States Patent [19]

Roberts et al.

[11] Patent Number: 4,654,385

[45] Date of Patent: Mar. 31, 1987

[54] ASPHALT COATING COMPOSITION

[75] Inventors: Michael G. Roberts, Heath; Frederick H. Ponn, Granville; Charles E. Bolen, Heath, all of Ohio

[73] Assignee: Owens-Corning Fiberglas Corporation, Toledo, Ohio

[21] Appl. No.: 814,446

[22] Filed: Dec. 30, 1985

[51] Int. Cl.⁴ .............................................. C08L 31/00
[52] U.S. Cl. ...................................... 524/69; 524/68; 524/71; 525/54.5
[58] Field of Search ................... 525/54.5; 524/68, 69, 524/71

[56] References Cited

U.S. PATENT DOCUMENTS

| | | | |
|---|---|---|---|
| 4,394,481 | 7/1983 | Grossi et al. | 525/54.5 |
| 4,419,489 | 12/1983 | Grossi et al. | 525/54.5 |
| 4,436,864 | 3/1984 | Grossi et al. | 524/458 |
| 4,440,816 | 4/1984 | Uffner | 428/40 |
| 4,456,633 | 6/1984 | Grossi et al. | 427/138 |
| 4,485,144 | 11/1984 | Uffner | 428/343 |
| 4,507,365 | 3/1985 | Lower et al. | 428/489 |
| 4,508,770 | 4/1985 | Muncaster et al. | 428/63 |

OTHER PUBLICATIONS

Owens-Corning Fiberglas brochure, "Tuff-N-Dri Exterior Foundation Waterproofing", 1985.

*Primary Examiner*—Melvyn I. Marquis
*Attorney, Agent, or Firm*—Ronald C. Hudgens; Robert F. Rywalski; Hiram P. Settle

[57] ABSTRACT

An asphaltic coating composition in the form of an emulsion of chemically modified asphalt and a normal, non-modified asphalt in an aqueous emulsification medium. The emulsion can be used as a primer or damp-proof coating and has good adherence to concrete, wooden or asphaltic substrates to yield a coating of excellent physical properties. The chemically modified asphalt and the normal asphalt can be blended prior to emulsification, can be separately emulsified and mixed to form a blended emulsion, or can be individually emulsified in the same emulsification medium.

12 Claims, No Drawings

ASPHALT COATING COMPOSITION

TECHNICAL FIELD

The present invention relates to an asphaltic coating composition in the form of an aqueous emulsion of chemically modified asphalt blended with a normal or non-chemically modified asphalt. The resultant product is an economical emulsion having a high solids content, good adherence to substrates, and desirable physical properties, such as low temperature flex, high tensile strength, and good elongation. The composition is particularly adapted for use as a primer for adhering an asphalt-based membrane to an asphalt and as a damp-proofing coating for basement walls and the like.

BACKGROUND AND SUMMARY OF THE INVENTION

U.S. Pat. Nos. 4,394,481 and 4,419,489 are both incorporated herein by reference. These patents disclose chemically modified asphalt (CMA) which is produced by the long-time reaction, under reflux, of an asphalt, a vinyl aromatic monomer, a rubbery polymer and an acrylamide. Such chemically modified asphalts are disclosed for use as protective coatings for various substrates and are applied, for example, to a cementitious substrate from a solvent carrier, typically a mixture of 80% toluene and 20% normal hexane. U.S. Pat. No. 4,507,365 proposes the use of an environmentally desirable solvent mixture of at least 75% cyclohexane, 15 to 25% toluene, and up to 10% n-hexane for essentially the same CMA.

U.S. Pat. No. 4,456,633 provides a chip seal emulsion of essentially the same CMA in an emulsion which may be cationic, anionic or non-ionic. Such emulsions are intended for use only as an additive for conventional non-chemically modified asphalt emulsions to increase the retention of aggregate, for example, when the combined emulsion is utilized for highway pavement repair. The method of use includes blending the CMA emulsion into the non-CMA emulsion, applying the combination to a pavement, and then applying an aggregate to the applied combination emulsion.

U.S. Pat. No. 4,419,489 discloses essentially the same CMA incorporated into an aqueous emulsion of the cationic rapid set type, the final emulsion comprising 60-65% CMA and 35-40% aqueous medium. The emulsion was intended for use as a cold overlay or as a joint sealer for highways or as a water-resistant membrane. This type of emulsion has been used as a waterproofing basement coating.

The present invention now provides an aqueous emulsion of a mixture or blend of chemically modified asphalt and normal or non-modified asphalt having a penetration ranging from about 10 to about 300, preferably from about 100 to about 300. Especially preferred is a blend of AC-5 asphalt with a CMA prepared by reacting an asphalt, styrene, one or more block copolymers of styrene and butadiene, and an acrylamide, such as dimethylaminopropylmethacrylamide (DMAPMA).

The aqueous emulsion of the present invention is substantially less expensive than the previously utilized CMA emulsion, and has desirable properties for use as a damp-proofing coating for concrete walls, as a primer for adhering asphalt-based membranes to various substrates, such as concrete or wooden surfaces, and the like.

Surprisingly, the outstanding properties of the CMA are largely preserved in the blended non-CMA-CMA coating which results from the application of the emulsion to a substrate and the evaporation of the aqueous emulsification medium. Thus, the unreacted asphalt does not serve merely as a low-cost diluent, since the replacement of from about 5% to about 60% of the CMA with unreacted asphalt does not cause a comparable reduction in the properties of the CMA emulsion. These properties include better low temperature flexibility, higher tensile strength and better elongation characteristics than would have been expected from the dilution of the CMA by the normal asphalt content of the emulsion. Further, the blend of CMA and non-CMA is more easily emulsified than the previous CMA, and the resultant emulsion has better shelf life and is more stable on storage for an extended period of time.

DETAILED DESCRIPTION OF THE PRESENT INVENTION AND INDUSTRIAL EXPLOITATION

The aqueous coating emulsions of the present invention include, as components, a chemically modified asphalt, a normal or unmodified asphalt, and an aqueous emulsification medium.

The term "coating" as used herein encompasses the utilization of the composition as a damp-proofing layer for a building basement or structural wall, and as an adhesive or primer for the subsequent application of a sheet waterproofing product or moisture barrier to a concrete or wooden structural member, as a paper laminating adhesive, or the like. This coating can be applied by any desired technique, as by spraying, roll coating, brush application, mechanical reverse roll coating, or the like.

The chemically modified asphalt or "CMA" is prepared by the process described in U.S. Pat. No. 4,419,489 utilizing generally the ingredients described therein. Generally, the CMA is prepared by reacting an asphalt, a vinyl monomer, one or more elastomers, and an acrylamide for an extended period of time, on the order of 20 to 30 hours, at an elevated temperature, on the order of 300° F. to 400° F., under reflux. The materials, amounts of materials, and the reaction conditions are selected to produce a final product having a viscosity on the order of about 1,200 to about 2,500 cps at 285° F., the viscosity preferably ranging from about 1,800 to about 2,000 cps.

The asphalt employed in the CMA will have a viscosity of less than about 120,000 cps (at 140° F.), preferably less than about 75,000 cps (at 140° F.). Outstanding materials are produced from asphalt having a viscosity of about 40,000 to about 60,000 cps (at 140° F.) or less. Asphalt materials which are suitable may be selected from those which are typically used for road paving, repair and maintenance purposes. Thus, such asphalt includes natural asphalt, petroleum asphalt and petroleum tar. The natural asphalts include, for example, asphaltite, such as Gilsonite, grahamite and glancepitch, lake asphalt, such as Trinidad asphalt, and rock asphalt. The petroleum asphalt that may be used includes straight asphalt obtained by distillation of a crude oil, blown asphalt, produced by blowing as oxygen-containing gas into straight asphalt, and solvent extracted asphalt. The petroleum tar that may be used includes coal tar and oil gas tar. Tar pitch is equally suitable. Preferably, the asphalt which will be employed is an asphalt cement of the type generally used for road paving, repair and maintenance purposes. Such asphalts typically have penetrations ranging between about 20 to about 200 with AC-5 paving grade asphalt being especially suitable.

Suitable polymerizable vinyl aromatic monomers are disclosed in detail in U.S. Pat. No. 4,419,489. Styrene monomer is preferred.

As the rubbery polymer, use can be made of a number of elastomeric materials which are well known to those skilled in the art. Included are natural rubbers as well as synthetic rubbers. Suitable are synthetic rubbers which are homopolymers of a conjugated diene (e.g., butadiene, isoprene, chloroprene, etc.) as well as various polymers which are substituted with a functional group containing a labile hydrogen atom. For example, various hydroxy, amino and like substituted homopolymers of conjugated dienes may likewise be used in the practice of this invention. Substituted butadienes are commercially available from, for example, Atlantic-Richfield under the trandemark "Poly B-D," a series of hydroxy-terminated butadiene polymers; for example, use can be made of hydroxy-terminated butadiene homopolymers like Poly B-D R-15M which has a hydroxy number of 42 or poly B-D R-45M.

Preferably, the rubbery polymer is an elastomeric material formed by copolymerization of one or more of the conjugated dienes described above with one or more ethylenic monomers such as styrene as well as hydroxy, amino and mercapto-substituted derivatives thereof, acrylonitrile, methacrylonitrile, acrylic acid, methacrylic acid, etc. Included are butadiene-styrene rubbers, butadiene-acrylonitrile rubbers, etc. Hydroxy-terminated copolymers are likewise useful in the practice of this invention, including the hydroxy-terminated butadiene-styrene copolymer designated "Poly B-D CS-15" and hydroxy-terminated butadiene-acrylonitrile copolymers like Poly B-D CN-15 having a hydroxyl number of 39.

The utilization of block copolymers of at least two monoalkenyl arene polymer end blocks and at least one elastomeric conjugated diene polymer midblock are preferred as rubbery polymers in the CMA. The number of blocks in the block copolymer is not of special importance, and the molecular configuration can be linear, graft, radial or star depending upon the method by which the block copolymer is formed. Block copolymers having end blocks of styrene and midblocks of butadiene or isoprene are particularly preferred. Such block copolymers are available under the trade names "Finaprene," available from Cosden Oil & Chemical Co. of Dallas, Tex. and "Kraton," available from Shell Chemical Company of Houston, Tex. Specifically preferred block copolymers include Finaprene 1205, a linear styrene-butadiene-styrene block copolymer having a butadiene/styrene ratio of 75/25 and a typical molecular weight of 125,000; and Finaprene 416, which is a radial styrene-butadiene block copolymer having a butadiene/styrene ratio of 70/30 and a typical molecular weight of 160,000. Other similar block copolymers are commercially available and are well known to those skilled in the art.

It has been found that mixtures of linear and radial block copolymers are particularly useful in the compositions of the present invention. Such mixtures, when incorporated into the reaction mixture, yield a CMA of the desired viscosity and tack while being relatively easily emulsified into the final emulsion product. Proportions of linear-to-radial copolymers ranging from about 1-to-1 to about 5-to-1 are suitable. A total elastomer content of about 8–10% by weight is preferred, with blends of about 8–10% Finaprene 1205 and about 0–2% Finaprene 416 being most preferred.

The acrylamides employed in the present invention are unpolymerized and have a double bond. Several specific suitable acrylamides are disclosed in detail in U.S. Pat. No. 4,419,489. Desirably, they may be secondary amides or tertiary amides. Preferably, the acrylamide will be a compound of the formula $(R_1)(R_2)C=C(R_3)-C(O)N(R_4)(R_5)$, wherein $R_1$, $R_2$ and $R_3$ are independently selected from hydrogen or an alkyl containing 1 to 3 carbon atoms; $R_4$ and $R_5$ are independently selected from hydrogen, an alkyl containing 1 to 3 carbon atoms, or preferably a radical of the formula $-R_6-N(R_7)(R_8)$, wherein $R_7$ and $R_8$ are independently selected from hydrogen or an alkyl having 1 to 3 carbon atoms, and $R_6$ is an alkylene group containing 1 to 5 carbon atoms. The preferred acrylamide is dimethylaminopropylmethacrylamide (DMAPMA), that is a compound of the formula $CH_2=C(CH_3)C(O)N(H)(CH_2)_3N(CH_3)_2$.

A preferred CMA contains, based on the asphalt content, from about 0.5 weight percent to about 35 weight percent styrene, from about 0.2 weight percent to about 15 weight percent DMAPMA, and from about 0.5 weight percent to about 30% elastomer. A particularly preferred CMA composition contains about 80 weight percent AC-5 asphalt, about 0.5 weight percent DMAPMA, about 9.5 weight percent styrene, about 8% linear styrene-butadiene block copolymer and about 2% radial styrene-butadiene block copolymer.

The normal or non-CMA asphalt can be any type of asphalt above described. An AC-5 asphalt having a softening point of about 35° C. and a penetration of about 120 at 25° C. is preferred. An acceptable specific alternative is an asphalt flux having a penetration of about 250–300 and a viscosity of about 1,200 to 1,600, nominal 1,482.

The aqueous emulsion medium preferably is water containing from about 0.5 to about 3% by weight of a surfactant, an amount of surfactant ranging from about 1.0 to about 2.5% by weight being preferred. The surfactant can be cationic, anionic or non-ionic, cationic being preferred. The fatty amines, most desirably fatty primary monoamines, are particularly useful. Specifically, Arosurf AA-60 (oleyl amine) can be utilized.

Additionally, a thickener, such as about 1 part by weight of a 2% aqueous solution of Cyanomer P-250 (polyacrylamide) or hydroxyethyl cellulose at about 0.25% by weight, may be added to the emulsion medium as a viscosity control and as an aid in drying the emulsion in place after a spray application.

The CMA and the normal (non-CMA) asphalt preferably are mixed prior to their addition to the aqueous emulsification medium. Alternatively, they may be separately added, simultaneously or sequentially, to the aqueous emulsification medium, or they may be separately emulsified in separate portions of the emulsification medium and then the two emulsions can be blended to form the final emulsion.

Preferably, the final emulsion is formed by hot blending the mixture of chemically modified asphalt and normal asphalt, then adding the molten asphalt blend at a temperature of about 250° F. to about 300° F., preferably about 285° F., to the premixed aqueous medium which has been preheated, e.g., to about 100° F.

The final emulsion thus contains a mixture of CMA and unreacted asphalt, no matter whether the CMA and the asphalt are added to the emulsification medium as a blend, or separately, or as separate emulsions. The CMA constitutes from about 40% to about 95% by weight of this mixture, preferably from about 50% to about 90%, and the unreacted asphalt is from about 5% to about 60% by weight, preferably from about 10% to about 50%.

The final emulsion will contain from about 30% to about 45%, preferably about 32% to about 40% emulsion medium, and about 55% to about 70% combined CMA and asphalt, preferably from about 60% to about 68%.

In the final emulsion, in its broad aspect where the emulsion contains from about 30% to about 45% emulsion medium, the emulsion may contain from about 22% to about 66.5% CMA and from about 2.75% to about 42% unreacted asphalt. In its preferred form, the emulsion may contain from about 30% to about 61.2% CMA and from about 6% to about 34% unreacted asphalt in from about 32% to about 40% emulsion medium.

EXAMPLE

Using a charge of about 80% by weight of AC-5 asphalt, about 0.5% by weight dimethylaminopropylmethacrylamide (DMAPMA), about 9.5% by weight styrene and about 10% elastomer consisting of about 8% Finaprene 1205 and about 2% Finaprene 416, a composition was produced as follows. The asphalt at a temperature of about 250° F. to about 310° F. was pumped into a reactor equipped with an agitator and a reflux condenser. The DMAPMA, styrene and elastomer were then added, and the reactor contents were heated at about 348° F. for about 24 hours with agitation and under reflux. The resultant chemically modified asphalt (CMA) had a viscosity of about 1800–2000 cps at 285° F.

An aqueous emulsification medium was prepared by adding about 2.25 parts by weight Arosurf AA-60 emulsifier (oleyl amine) to about 100 parts by weight of water and about 1 part by weight of a 2% aqueous solution of Cyanomer P-250 (polyacrylamide) was also added as a thickener. The emulsification medium was adjusted to a pH of 3 by the addition of hydrochloric acid.

Using a colloid mill, an emulsion was prepared containing about 32.5% by weight CMA prepared as above set forth, about 32.5% by weight unreacted AC-5 asphalt, and about 35% by weight aqueous emulsification medium. The CMA and the asphalt were added at a temperature of about 285° F., and the aqueous medium was at a temperature of about 100° F. The resultant aqueous emulsion had good shelf life and a uniform black color. The emulsion viscosity was 3,544 cps at room temperature, and the emulsion contained 63.46% solids.

The properties of a coating deposited by these emulsions, i.e., after evaporation of the emulsifying medium, can be seen from Tables I and II. In each Table, the CMA was prepared as set forth in the preceding Example. The indicated non-CMA-CMA mixtures of Table I included AC-5 as the "non-CMA" ingredient, the mixture of Table II included an asphalt flux as the "non-CMA" ingredient. In the Tables, the tensile strengths, the percent elongation and the percent recovery were all determined by ASTM test method D412. The low temperature flex was determined by conditioning the sample at the indicated temperature and bending it about a 1-inch mandrel.

TABLE I

| % CMA | % AC-5 Asphalt | Low Temp. Flex | Ultimate Tensile Strength (p.s.i) | % Elongation | Percent Recovery |
|---|---|---|---|---|---|
| 100 | 0 | −5° F. | 17.37 | 1400 | 90.2 |
| 90 | 10 | −5° F. | 12.21 | 1580 | 89.6 |
| 80 | 20 | 0° F. | 10.01 | 1340 | 87.5 |
| 70 | 30 | 5° F. | 8.50 | about 1600 | 86.8 |
| 50 | 50 | 10° F. | 4.09 | 1600 | 75.3 |

TABLE II

| % CMA | % Asphalt Flux | Low Temp. Flex | Ultimate Tensile Strength (psi) | % Elongation | Percent Recovery |
|---|---|---|---|---|---|
| 100 | 0 | −5° F. | 17.37 | 1400 | 90.2 |
| 90 | 10 | 0° F. | 13.77 | 1600 | 88.1 |
| 80 | 20 | 0° F. | 10.65 | 1600 | 87.1 |
| 70 | 30 | 0° F. | 11.25 | 1270 | 86.8 |
| 50 | 50 | 10° F. | 3.63 | 1600 | 76.7 |

These coatings can be utilized for the spray coating, brush coating or roller coating of substrates, typically concrete or wooden structural walls. The emulsion as applied is brown, and it turns black upon curing or evaporation of the emulsion water. The coatings have utility as basement wall damp-proofing coatings, or as a primer for the adherence of an asphalt-based membrane or a fiberglass non-woven mat to a structural wall. The coating remains tacky to the touch for several days after curing. Thus, when used as a primer, a later-applied membrane or mat need not be immediately placed over the primer.

What is claimed is:

1. An aqueous coating emulsion comprising:
   (A) from about 40 weight percent to about 95 weight percent of the reaction product of a major amount of asphalt of penetration grade ranging from about 20 to 200, a vinyl aromatic monomer, an acrylamide, and at least one rubbery polymer;
   (B) from about 5 weight percent to about 60 weight percent of additional asphalt of penetration grade ranging from about 20 to about 200; and
   (C) an aqueous emulsion medium of water containing from about 0.5 weight percent to about 3 weight percent surfactant.

2. An emulsion as defined in claim 1, wherein the vinyl aromatic monomer is styrene, the acrylamide is dimethylaminopropylmethacrylamide, and the at least one rubbery polymer is a block copolymer selected from the group consisting of styrene-butadiene and styrene-isoprene copolymers.

3. An emulsion as defined in claim 2, wherein the at least one rubbery copolymer is a mixture of a linear block copolymer and a radial block copolymer.

4. An emulsion as defined in claim 2, wherein the ingredient (A) comprises, based on the asphalt, from about 0.5 weight percent to about 35 weight percent styrene, from about 0.2 weight percent to about 15% dimethylaminopropylmethacrylamide, and from about 0.5 weight percent to about 30% of at least one block copolyer of styrene-butadiene.

5. An emulsion as defined in claim 1, wherein the ingredient (B) is AC-5 asphalt.

6. An emulsion as defined in claim 5, wherein the ingredient (A) is present in an amount ranging from about 50 weight percent to about 90 weight percent, and the ingredient (B) is present in an amount ranging from about 10 weight percent to about 50 weight percent.

7. An emulsion as defined in claim 6, wherein the emulsion comprises from about 32 weight percent to about 40 weight percent of the emulsion medium and from about 60 weight percent to about 68 weight percent of the combined ingredients (A) and (B).

8. The process of making an aqueous coating composition, comprising the steps of:
(1) reacting a major amount of an asphalt with a vinyl aromatic monomer, an acrylamide and a rubbery polymer;
(2) blending the reaction product of step (1) with additional unreacted asphalt, the unreacted asphalt comprising from about 5 weight percent to about 60 weight percent of the total blend; and then
(3) emulsifying the blend of ingredients (1) and (2) in from about 30 weight percent to about 45 weight percent water containing from about 0.5 weight percent to about 3 weight percent of a surfactant.

9. The process of making an aqueous coating composition, comprising the steps of separately emulsifying in an aqueous based emulsification medium, (1) the reaction product of a major amount of an asphalt with a vinyl aromatic monomer, an acrylamide and a rubbery polymer; and (2) additional unreacted asphalt, and blending the two separate emulsions to provide a final aqueous emulsion comprising from about 55 weight percent to about 70 weight percent of a mixture of ingredients (1) and (2) and from about 45 weight percent to about 30 weight percent aqueous based emulsification medium, the mixture of ingredients (1) and (2) containing from about 40 to about 95 weight percent of ingredient (1) and from about 5 to about 60 weight percent of ingredient (2).

10. The process of making an aqueous coating composition, comprising the steps of:
(1) mixing from about 22 weight percent to about 66.5 weight percent chemically reacted asphalt formed as the reaction product of asphalt, styrene, an acrylamide and at least one rubbery polymer, and from about 2.75 weight percent to about 42 weight percent unreacted asphalt, with from about 30 weight percent to about 45 weight percent aqueous emulsion medium comprising water and from about 0.5 weight percent to about 3 weight percent of surfactant; and
(2) emulsifying the mixture to form an emulsion containing from about 58 weight percent to about 70 weight percent solids.

11. The process of claim 10, wherein the final emulsion comprises from about 30 weight percent to about 61.2 weight percent chemically reacted asphalt, from about 6 weight percent to about 34 weight percent unreacted asphalt, and from about 32 weight percent to about 40 weight percent emulsion medium.

12. In an aqueous emulsion of the reaction product of asphalt, a vinyl aromatic monomer, an acrylamide and a rubbery polymer, the improvement which comprises from about 5 to about 60% of an unreacted asphalt in addition thereto to obtain a low-cost aqueous emulsion without a comparable reduction in the physical properties of the emulsion.

* * * * *